M. RANSOM & W. C. STONE.
Music Leaf Turner.
No. 229,839.                    Patented July 13, 1880.
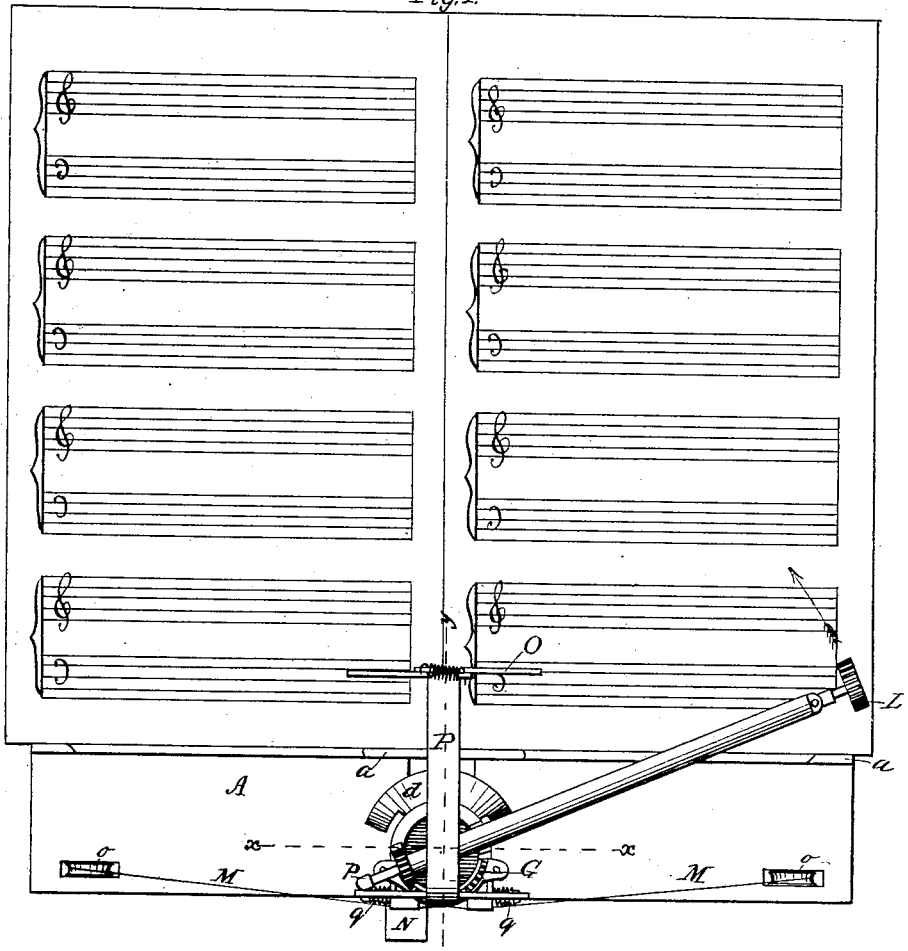
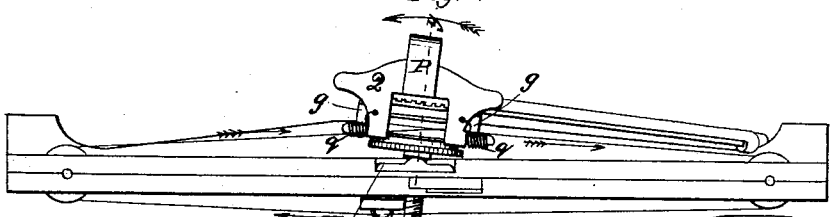
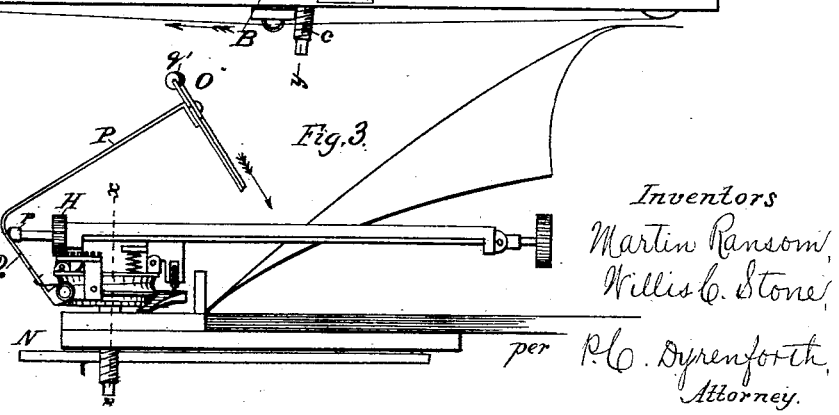
Witnesses:
F. B. Townsend
D. Bain
Inventors
Martin Ransom
Willis C. Stone
per P. C. Dyrenforth
Attorney.

M. RANSOM & W. C. STONE.
Music Leaf Turner.
No. 229,839.  Patented July 13, 1880.
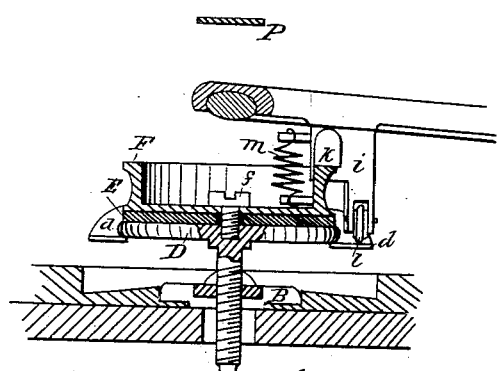
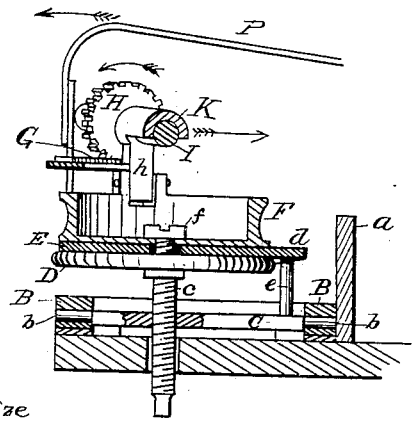
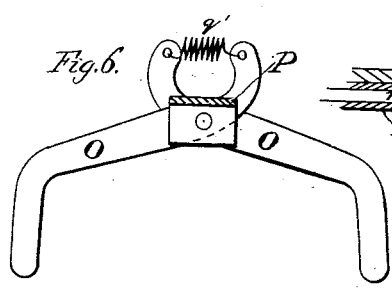
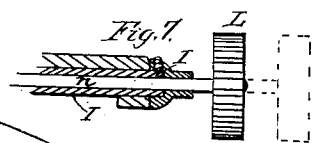
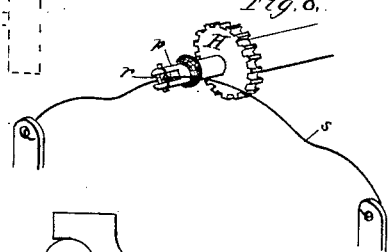
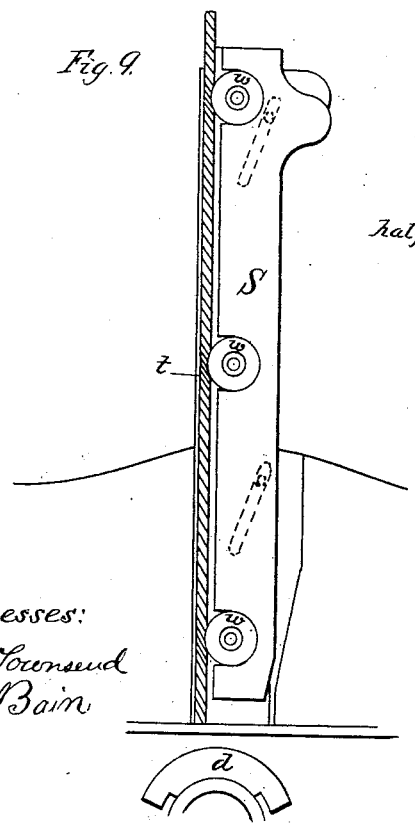
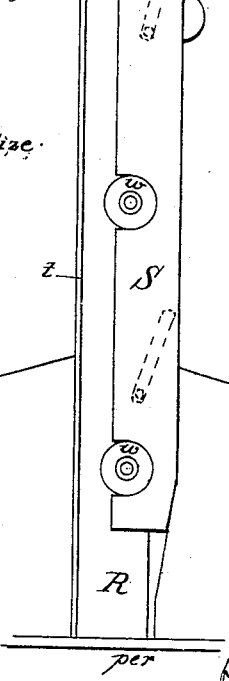
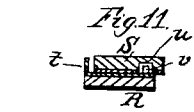
Witnesses:
F. B. Townsend
D. Bain
Inventors
Martin Ransom
Willis C. Stone
P. C. Dyrenforth,
per
Attorney
N. PETERS, PHOTO-LITHOGRAPHER, WASHINGTON, D.C.

UNITED STATES PATENT OFFICE.

MARTIN RANSOM AND WILLIS C. STONE, OF CHICAGO, ILLINOIS, ASSIGNORS OF ONE-THIRD OF THEIR RIGHT TO EDWARD RANSOM, OF SAME PLACE.

MUSIC-LEAF TURNER.

SPECIFICATION forming part of Letters Patent No. 229,839, dated July 13, 1880.

Application filed August 1, 1879.

*To all whom it may concern:*

Be it known that we, MARTIN RANSOM and WILLIS C. STONE, both of the city of Chicago, in the county of Cook and State of Illinois, have invented certain new and useful Improvements in Leaf-Turners; and we hereby declare the following to be a full, clear, and exact description thereof, reference being had to the accompanying drawings, of which—

Figure 1 is a front elevation of our device; Fig. 2, a lower end view; Fig. 3, a side view with the arm half turned; Fig. 4, a section on the line $x\ x$, Fig. 1; Fig. 5, a section on the line $y\ y$, Fig. 1; Fig. 6, a detail view of the straddling device; Fig. 7, a detail view, partly in section, showing the means for extending the shaft; Fig. 8, a perspective view of a modification; Figs. 9 and 10, front elevations of the sheet-music clamp in and out of operation, and Fig. 11 a cross-section of the last.

Our invention relates to a device for turning the leaves of music, and incidentally for clamping sheet-music, in order to permit the device to operate; and it consists, first, in an arm pivoted at one end, in line with the center of the music, to a suitable frame, and having at its opposite end a rubbing device, and connected with mechanism whereby the moving of a lever or other suitable agent causes the outer end of the said arm to bear down upon the leaf at the outer limits of its course and to sweep across the music from side to side, and also causes the said rubbing device to turn in a direction contrary to that in which the arm moves; furthermore, in the mechanical details and combinations of parts by means of which we carry our invention into effect; and, finally, in the clamping device for sheet-music, all as hereinafter more fully set forth.

Referring to the drawings, A is a frame or rack for holding the music and the turning device, and having a ledge, $a$, for the lower end of the music to rest against. B B are journals set into a recess in the said frame below the ledge $a$, as shown, and C is a plate having trunnions $b$, which rest within the journals B and maintain the plate C a little above the bottom of the recess, whereby it has a slight rocking capacity. This plate, as will be seen, supports the entire turning mechanism with the exception of the lever, or whatever the agent may be that is employed to operate the device.

D is a disk having a milled edge and forming the head of the screw $c$, which latter works up and down through the plate C, and E is a circular plate which lies upon the disk D, and has its farther side extended into a cam, $d$, of the configuration shown—that is to say, curved concentrically with the plate E and highest above the frame A at the center, where it may be flattened, and thence descending both ways toward the said frame. A pin, $e$, projecting downward from the cam $d$ and passing loosely through a hole in the plate C, prevents this plate from turning. F is a hollow pulley, open on its upper side and turning freely on a screw, $f$, which secures it to the disk D.

From the plate E two posts, $g$, extend upward, as shown, past the pulley F, and support the curved rack G. H is a pinion engaging with the rack G and rigidly fixed to the arm I, which passes through the sleeve K. This sleeve is hinged to the upper edge of the pulley F, at the point thereof which will be nearest the player when the arm I is in line with the center of the music, by means of the projection $h$, as clearly shown in Fig. 5, and a second projectioion, $i$, slides in guides $k$ on the edge of the pulley opposite the hinge, and continues still farther down outside the pulley, terminating in a small tram-wheel, $l$, which rests upon the cam $d$ and is continuously borne down upon the same by a suitable spring, $m$, connecting the sleeve K with the pulley.

The arm I should be made extensible by the means, for example, shown in Fig. 7—namely, a rod, $n$, sliding but not turning within the arm itself; but whether extensible or not, the arm is provided at its outer extremity with a rubbing device, L. We commonly make this rubbing device of a button of india-rubber or other gummy and more or less adhesive substance, roughened upon its periphery, and rigidly secured to the outer extremity of the arm I. This is the means represented in the drawings; but we do not wish to be understood as limiting ourselves thereby, since a similar button of metal or other material, with projecting points on its periphery of a length not exceeding the thickness of a music-leaf, would be in every sense the equivalent of such rubber button, as will presently be apparent.

M is a strong cord passing around the pulley F, and thence extending in opposite directions around pulley-wheels o, the ends being then brought together, or nearly so, and connected to a central lever, N, pivoted at its extremity farthest from the player.

For a piano, the lever would require to be pivoted to the under side of the instrument and the pulley-wheels set in attachments adapted to fit upon the ends of the same, whereby the moving of the said lever with the knee would cause the turning of the pulley F, and the consequent moving of the arm; but where the device is made a part of a newly-constructed piano the cord may pass down through the instrument, thus allowing it to be much shorter. Where the device is attached to a music stand or desk the above means would naturally require such modification as to operate with a treadle.

It is advisable, especially with new books or music-sheets, to have an attachment for holding the leaves flat when turned. We therefore employ the straddle O, resembling somewhat in construction a pair of ordinary ice-tongs. These are loosely pivoted to an arm, P, projecting forward above the sleeve K, in line with the center of the music, from a plate, Q, working forward and back on bearings projecting from the plate E, as shown. A backward projection or extension, p, of the arm I presses against this plate as the said arm is turned, throwing it backward, and thus, of course, lifting the straddle, in opposition to the springs q at the journals. A spring, q', connects the upper ends of the straddle.

Another mode of producing the rise and fall of the straddle is indicated at Fig. 8, where, instead of pressing against the plate, the extension p of the arm is slotted and forms bearings for a small pivoted block, r, having a hole near its outer edge, which slides on a firm guide-wire, s. In this way the friction caused by the springs q is avoided.

The attachment for clamping sheet-music comprises the strip or plate R, with a shoulder, t, along one edge, and the plate or strip S, lying upon the said plate R, and provided with oblique slots u, as shown, which slide on studs v, projecting from the strip R. Wheels w, capable of revolving, and preferably composed of india-rubber or similar elastic and semi-adhesive substance, are set into the strip S, projecting beyond the edge of the same, contiguous to the shoulder t. In general we construct the strips R and S of metal backed with wood; but this is merely a matter of mechanical expediency.

To clamp the music, the strip S is slid upward, bringing it, owing to the arrangement of the studs and slots above explained, into the position shown in Fig. 10. The edge of the music is then set against the shoulder t and the strip S pressed down against it, as represented in Fig. 9. Owing to the rotative action and elasticity of the wheels w, the music is thus held with great firmness.

Supposing the device to be attached to a piano and the lever N to be operated by the knee, the operation is as follows: The music being placed in position, the arm I is, if necessary, adjusted by means of the extension device so as to bring the head L upon the lower outside corner of the leaf, when the arm is in the position represented in Figs. 1 and 2. The whole device may be raised or lowered, if required, by turning the disk D, which, as already explained, constitutes the head of the set-screw c. This adjustment, however, will rarely be found necessary, as the device has, through the rocking action of the plate C, which carries it, sufficient play for all ordinary purposes without it; but this play may not be sufficient where a change is made from sheet-music to a thick book, or from a thick book to sheet-music, as is sometimes done.

Now, let it be required to turn the right-hand leaf. For this purpose the arm is brought to the position indicated at Figs. 1 and 2, and then the knee-lever pressed toward the left, when the following obviously will be the effects: First, owing to the drag upon the pulley by the right-hand part of the cord M, the device will be tipped in that direction, causing the button L to bear hard upon the corner of the leaf; secondly, the revolving of this pulley, produced by the movement of the lever, causes the arm to sweep across the music toward the left; thirdly, since the pinion H is fixed to the arm I and engages with the stationary rack G, the turning of the pulley causes the said arm I, and hence also the button L, to revolve in a direction contrary to that in which the arm swings, and this rotation of the button L at the time when it is pressed down upon the corner of the leaf operates to rub the latter away from those below; fourthly, as the arm and the sleeve containing it pass to the left the tram-wheel l travels up the incline of the cam d, thus lifting the arm away from the leaf in opposition to the spring m, and after passing a short distance the corner of the leaf flips over the top of the arm, and is thus pushed and lifted across the central line; and, fifthly, as the arm passes across the music the rear projection, p, describing an arc, presses back the plate Q, lifting the straddle O out of the way of the arm and of the turning leaf, as represented in Fig. 3, and then, whether the arm is continued on its course to the opposite corner or (as will more frequently be the case) is brought back again to the same corner to gather up the next leaf, the said straddle descends and presses the leaves flat. The straddle is given a slight play on the pivot which connects it to the arm P, in order that it may conform to unequal thicknesses of leaves on the two sides, and this, in connection with the tongs-like construction, enables it to bear evenly on the leaves, and also to smooth them down.

If desired, small rollers may be attached to the ends of the straddle to cause them to slide more easily upon the leaves.

Everything that has been said in regard to the turning from right to left applies with equal force to the turning from left to right. There is, in fact, not a single point of difference between the two actions.

The straddle is not indispensable, though it materially aids in rendering the device thoroughly effective, for at the time when the button L is bearing upon and rubbing up the leaf it is pressing upon the said leaf at a point intermediate between the margin and the center, and it thereby assists in the picking up of the leaf and in causing the same to flip over the arm.

The action of our apparatus may be likened to rubbing up the corner of the leaf with a moistened thumb and carrying it forward, lifting the hand slightly meanwhile until it crosses the center, and then smoothing it down with the other hand.

What we claim as new, and desire to secure by Letters Patent, is—

1. A leaf-turner in which an arm is pivoted at one end, in line with the center of the music, to a suitable frame, and provided at its opposite end with a rubbing device, as specified, and is connected with and operated by mechanism whereby the moving of a lever or other suitable appliance causes the said arm to sweep across the music from side to side thereof, and the outer end to bear down upon the leaf when at the margin of the same, and also causes the said rubbing device to revolve in a direction always contrary to that in which the arm moves, substantially as and for the purpose set forth.

2. The combination, upon a suitable frame, of the pulley F, sleeve K, attached to said pulley, cord M, connected with a suitable lever, rack G, pinion H, and arm I, passing through said sleeve K and terminating with a suitable rubbing device, substantially as and for the purpose set forth.

3. The combination, upon a suitable frame, of the arm I, terminating with a rubbing device, as set forth, pulley F, operated by cords M, connected with a suitable lever, projection $i$, terminating with a tram-wheel, and cam $d$, substantially as and for the purpose described.

4. The combination, upon a suitable frame, of the arm I, terminating with a rubbing device, as set forth, and having a rotary motion communicated to it by means of a rack, G, and pinion H, sleeve K, inclosing said arm and having the projection $i$, as shown, terminating with a tram-wheel, pulley F, to which the rear end of the said sleeve is hinged, and to which it is also connected by a spring, $m$, said pulley being revolved by means of a cord, M, connected to a suitable lever, and cam $d$, inclined toward the frame on each side of its center, substantially as described.

5. A leaf-turner comprising an arm terminating with a rubbing device, as set forth, and connected with mechanism whereby it may be caused, through the movement of a lever or other suitable agent, to bear down upon the margin of a leaf, rub the same separate from the rest, and carry it over to the opposite side, the whole being mounted on a rocking plate, B, substantially as and for the purpose specified.

6. A leaf-turning device comprising an arm terminating with a rubbing device, as set forth, and operated by mechanism which causes it to bear down upon the margin of a leaf, rub the said leaf free from the rest, and carry it over to the opposite side, in combination with a set-screw, D $c$, working in a suitable frame and supporting the said arm, with its attendant mechanism, whereby the same may be adjusted to different levels, substantially as described.

7. The combination of the rocking plate B in bearings upon a suitable frame, set-screw D $c$, passing through said plate, plate E, carrying the rack G and cam $d$, and prevented from turning by means of a pin, $e$, passing loosely through the plate B, pulley F, centrally pivoted to the disk of the set-screw and operated by a cord, M, connected with a lever, N, or other suitable agent, sleeve K, hinged at its rear end to the said pulley, also connected to the same by means of the spring $m$, and provided with the projection $i$, terminating with the tram-wheel $l$, which rests on the cam $d$, and arm I, passing through the said sleeve and provided with the pinion H, which engages with the rack G, and terminating with a rubbing device or substance rigidly attached to the said arm, whereby it revolves with the same, substantially as described.

8. The arm I, provided at its outer end with a rubbing device, L, as described, and made extensible, whereby it may be adjusted to the margin of leaves of different widths, in combination with mechanism, upon a suitable frame, by means of which, through the moving of a lever or other suitable agent, the said rubbing device is caused to bear down upon the margin of a leaf, rub the same free from the rest, and carry the leaf over to the opposite side, substantially as set forth and shown.

9. The straddle O, attached to an arm, P, adapted to work up and down, as described, by means of a hinge, and caused to rise and fall by means of an extension, $p$, of the arm I, substantially as and for the purpose set forth.

10. The clamping device consisting of the strip R, provided with the shoulder $t$, strip S, having the slots $u$, working on pins $v$, projecting from the strip R, and wheels $w$, set into the strip R and projecting beyond the edge thereof, the whole being constructed and arranged to operate substantially as described.

MARTIN RANSOM.
WILLIS C. STONE.

In presence of—
P. C. DYRENFORTH,
EDWARD D. WINSLOW.